Figure 1:
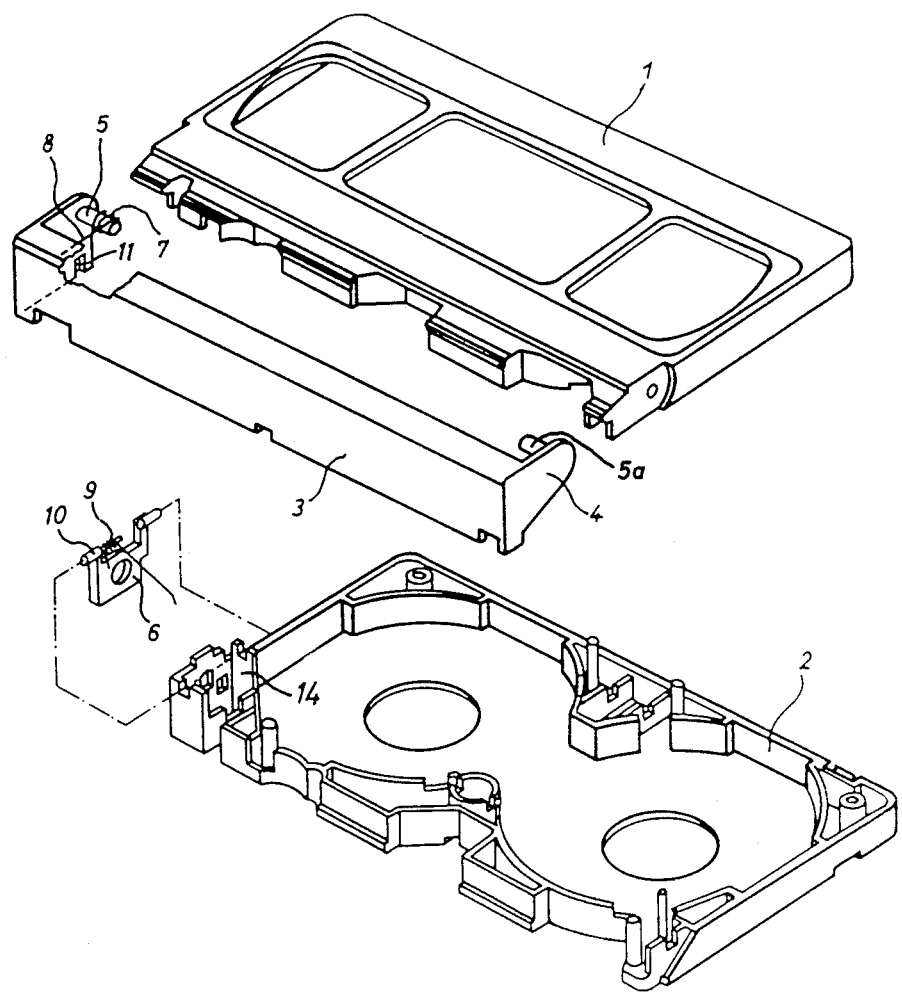

United States Patent [19]

Pertzsch et al.

[11] Patent Number: 4,712,150

[45] Date of Patent: Dec. 8, 1987

[54] TAPE CASSETTE HAVING A LOCK MECHANISM FOR LOCKING A TAPE PROTECTIVE LID

[75] Inventors: Albert Pertzsch, Munich; Ludwig Zeroni, Ottobrunn; Hubert Brunner, Weil, all of Fed. Rep. of Germany

[73] Assignee: Agfa Gevaert Aktiengesellschaft, Leverkusen, Fed. Rep. of Germany

[21] Appl. No.: 824,531

[22] Filed: Jan. 31, 1986

[30] Foreign Application Priority Data

Feb. 13, 1985 [DE] Fed. Rep. of Germany ....... 3504965

[51] Int. Cl.⁴ .......................................... G11B 23/087
[52] U.S. Cl. .................................................. 360/132
[58] Field of Search ........................ 360/132; 242/198

[56] References Cited

U.S. PATENT DOCUMENTS 4,173,319 11/1979 Umeda ................................. 360/132
4,608,616 8/1986 Wakui et al. ........................ 360/132

*Primary Examiner*—Robert S. Tupper
*Attorney, Agent, or Firm*—Connolly & Hutz

[57] ABSTRACT

A locking plate for front panels of magnetic tape cassettes, particularly video tape cassettes, which has a hinged bearing and contains a spring which exerts a torque in a direction towards the barred position, whereby the plate spring is injected on the journal bearing of the locking panel pointing inside the casette and is U-shaped and that its free end touches the wall of the cassette housing.

4 Claims, 3 Drawing Figures

TAPE CASSETTE HAVING A LOCK MECHANISM FOR LOCKING A TAPE PROTECTIVE LID

The present invention relates to the locking of a hinged front panel for magnetic tapes cassettes, particularly video tape cassettes.

The cassette housing of a video tape cassette, for example of the VHS type, is provided with a hinged front panel as a cover, which protects the magnetic tape of an unused cassette from dirt. The front panel opens when the cassette is placed in the video recorder. In order to prestress the opening and locking device, there is an axle positioned on the inside of the front panel covering the side, which axle bears a spring coil and the long spring leg of which is positioned on the front panel, this, however, only being the case with the preassembled springs in the front panel, otherwise the support takes place in the upper part of the housing. The front panel is at the same time maintained in a closed state by a locking plate. Small coiled springs (DE-OS No. 28 37 889) or a plate spring (DE-OS No. 28 37 890), which on the one hand act on the locking plate, and on the other hand are supported on a fixed wall of the housing, are used for the locking device. The two spring combinations operate perfectly, their disadvantages, however, can be easily recognised, for example, a high number of parts for the locking device, costly testing assembly, construction, which takes place in successive sections. In U.S. Pat. No. 4,466,583 and DE-GM No. 81 21 098 an injected plastics material spring for the locking plate is described in each case, which reduces the number of parts, as mentioned above. In both cases, the plastics materials spring is injected in the area of the hinged axle, while the free end of the spring is positioned on the housing wall, which seals off the space behind the locking plate. Since the centre of rotation and the point of application of force are positioned relatively far apart from each other, material fatigue is to be expected after a certain time owing to the relatively great spring deflection when opening the locking plate, when on moving the spring, the elastic deformation limit is exceeded. For achieving the necessary spring forces, a correspondingly thin material cross section must be selected for the plastics material spring, which, however, also impairs the injectability.

In an analogeous manner, a catch and a spring are described in U.S. Ser. No. 795,867 now abandoned which overcome some of these above-mentioned disadvantages of the mechanism which consists of different catch parts and springs. This patent specification describes a sliding catch mechanism by which the sealing panel of the tape cassette is barred in the sealed position and which comprises a spring which is produced with the catch device from one part and which moves the catch device in a direction towards the barred position. This integrated catch mechanism of the above-mentioned patent specification suffers from the disadvantage, however, that a substantial dynamic effect is necessary on the mechanism in order to move the catch device in its opened or unbarred position. Another disadvantage of this catch mechanism is that it is particularly subject to the so-called "creep" properties which occur with plastics material parts and result in them adopting a particular shape after a certain time. This particularly occurs when they are subjected to relatively high temperatures, for example in the reproducing machines. This "creep" behaviour of the spring which then adopts a form as exists in the opened or unbarred position, reduces the ability of the spring to return the catch device to the barred position.

The object of the present invention is to achieve the sealing of the front panel and the locking thereof with a locking plate without the described disadvantages, whereby it is not necessary to reconstruct an optionally existing injection moulding dye, and also a simplified assembly is involved.

Accordingly the present invention provides a locking plate for front panels of magnetic tape cassettes, particularly video tape cassettes, which has a hinged bearing and a spring which exerts a torque in a direction towards the barred position, wherein a plate spring is injected on the journal bearing of the locking panel, pointing towards the housing part and is U-shaped, its free end touching the wall of the cassette housing.

Details of the invention are given in the sub-claims and the description.

The opening and locking device according to the invention necessitates no change in the housing parts, the injection part for the locking plate needs to be only slightly changed and the assembly of the locking plate is substantially simplified.

Figure 2:
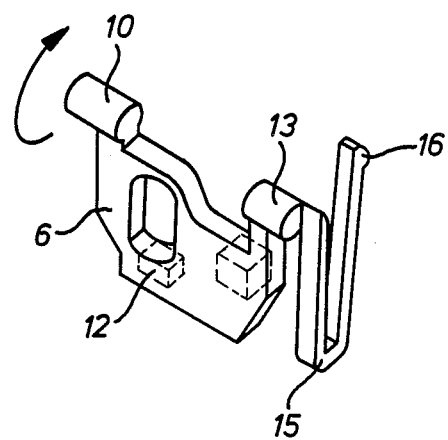
Figure 3:
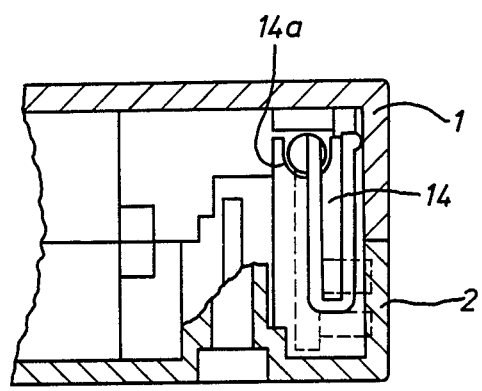

Preferred embodiments of the present invention will now be explained in more detail by example only with reference to the drawings:

FIG. 1 shows a perspective view of a video tape cassette with a front panel, locking plate and the two springs according to the prior art, FIG. 2 shows a perspective view of the locking plate with the injected plate spring according to the invention, FIG. 3 shows a cross-section drawing according to FIG. 2.

FIG. 1 shows a commercial video tape cassette consisting of an upper and lower housing half 1, 2 which are screwed together during construction. The magnetic tape passes from the unwinding reel past the front edge of the housing and is wound onto the winding reel (tape and reels not shown). A front panel 3 with side walls 4, on the inner sides of which pegs 5, 5a are injected, around which the front panel can be hinged, serve to protect the tape from dirt. In the lower half of the housing, a hinged locking plate 6 is incorporated, which acts together with a recess 11 positioned in the side wall 4 of the front panel. The spring 7 is firstly pre-stressed in the front panel. The spring coil is positioned on the peg 5 and the long spring leg 8 grips under the front panel. A second spring, the so-called locking spring 9, is positioned with its coil on a bearing journal 10 of the locking plate, whereby the short spring leg is positioned on the locking plate and the long spring leg is supported on a base in the lower half of the housing. The locking plate can be hinged by means of the projection 12 shown in FIG. 2 and thus the front panel can be unlocked.

The locking spring 9 is replaced according to the invention by a U-shaped plate spring 15 injected on the journal bearing 13, the free end 16 of which is positioned on the housing wall. When unlocking, the locking plate 6 is rotated in the direction marked in on FIG. 2, the free end of the plate spring exerting a torque in a direction towards the barred position. Since the journal bearing 13 is positioned on the recess 14a of the inner wall (FIG. 3) which forms part of the lower part of the housing 2, it is horizontally extended such that the plate spring does not touch the inner wall. The inner wall thus spacially separates the locking plate from the plate spring.

The geometry of application according to the invention of the catch locking plate and the plate spring is arranged such that the contact point of the plate spring on the cassette housing and the turning point of the catch locking plate are so close together that when completely unlocked, the plate spring experiences only a slight spring deflection, such that it remains within the elastic deformation limit and thus is hardly subject to material fatigue. For this reason, relatively large spring cross sections can also be produced which substantially simplifies the injectability.

Since the typical locking spring 9 is no longer required and the locking plate together with the injected plate spring forms a single part, one less part is required during assembly, which moreover reduces the storage and testing costs. The plate spring can be injected on the locking plate by simple modification to the injection device, however, it is not necessary to reconstruct the injection device for injecting the locking plate.

The free end 16 of the plate spring, as indicated in FIG. 2, can be thickened in the sahpe of a hump at the position lying on the cassette housing. Moreover, to achieve a sufficient spring tension of the free leg, the plate spring is dimensioned in length such that the free end is positioned at about the height of the journal bearing 13, whereby it touches the upper part of the housing 1.

What is claimed is:

1. In a cassette for a magnetic video tape, the combination of
   a two part housing with
   an upper housing,
   a lower housing,
   said upper and lower housings each having a front wall formed with apertures and side walls,
   a front panel pivotally mounted on the side walls so constructed and arranged as to have an open position and a closed position with respect to the apertures,
   side parts of the front panel partly overlapping the side walls
   a locking plate mounted on a inner wall of the lower housing half,
   a journal bearing on said locking plate rotatably supported in recesses in said inner wall of the lower housing half providing means for hinging said locking plate on the axis of rotation of said journal bearing so constructed and arranged that the plate is positioned inside the front part of the side walls and the side parts of the front panel,
   spring means mounted on the inside of the side part of said front panel under torque and engaging the front panel so constructed and arranged to tend to move the front panel from closed to open position,
   means on the plate for engaging the front panel so constructed and arranged as to close the panel over the apertures and to be disengageable upon hinging of the plate,
   a U-shaped spring integral with said journal bearing having an arm with a free end positionable on and engageable with the upper housing half so constructed and arranged as to apply a force to the journal bearing tending to produce an angular moment in the plate and engage the plate with the front panel.

2. A locking plate according to claim 1, wherein the plate spring consists of the same plastics material as the locking plate.

3. A locking plate according to claim 1, wherein the free end at the plate spring, positioned on the cassette housing, thickens towards the cassette housing.

4. A locking plate according to claim 1, wherein the arm of the plate spring positioned on the housing wall is dimensioned in length such that the free end is positioned at about the height of the journal bearing.

* * * * *